Patented Nov. 8, 1938

2,135,594

UNITED STATES PATENT OFFICE 2,135,594

SOY BEAN NUTS

Irving A. Nohe, Oak Park, and Rollin H. Moulton, Western Springs, Ill., assignors to Soy Bean Products Co., Chicago, Ill., a corporation of Illinois No Drawing. Application November 30, 1936, Serial No. 113,452

10 Claims. (Cl. 99—98)

This invention pertains to soy bean nuts, and more particularly to a method for processing soy beans to produce palatable nuts or nut products.

There have been numerous attempts heretofore to make nuts from soy beans, but the products thus made have not been palatable and have retained the bitter taste characteristic of soy beans. Other attempts have been made to produce a proper soy bean flour, and to produce soy bean nuts for other uses, but with no uniformity of result.

It is therefore an object of this invention to provide a process which will produce a uniformly palatable nut or nut product.

Another object is to provide a process for wholly removing the disagreeable tastes from soy beans in the process of making soy bean nuts.

Yet another object is to provide an inexpensive process for producing a nut delicacy from soy beans having a high food value and a high vitamin content.

A further object is to provide a salted soy bean nut which may be processed to any desired nut flavor.

A still further object is to provide a soy bean nut which may be used either alone or in combination with other food products, such as in bread or in candy fillings.

A yet further object is to provide a soy bean nut in which the freshness of the nut and the flavor thereof are retained indefinitely, even after the container has been opened.

With these and various other objects in view, the invention may consist of certain novel features as will be more fully described and particularly pointed out in the specification and claims appended hereto.

In practicing the invention contemplated herein of producing a desirable soy bean nut on a commercial scale, a suitable quantity of soy beans is placed in large vessels, preferably non-metallic crocks, and enough water is added so that the beans will swell to substantially twice their normal size, that is, the large diameter of the soaked bean will be substantially twice that of the unsoaked bean, and the length of the soaked bean will be substantially twice that of the unsoaked bean. The temperature of the added water is substantially room temperature, i. e., 70° F. and the beans are soaked a sufficient time to absorb 120% water by weight, the time necessary for this absorption being substantially from 15 hrs. to 18 hrs. This time could be decreased or increased by utilizing hotter or colder water. However, it is not desirable to soak the beans for too long a period of time, as the cost of the final product would be increased; nor is it desirable to increase the cost by providing means for heating the water. In no case should water be used which is above the boiling point, or below freezing.

After the soaking operation the beans are placed upon racks and allowed to drain. The beans, after draining, are put in large kettles, and over the beans is poured a heavy solution of sodium chloride, the same preferably being from a 5% solution to one of 22%. The lower percentage solutions are adaptable more particularly to be used where the soy bean nuts are to be incorporated in other foods, such as where they are to be used in bread making, or in candy, whereas the higher percentage solutions are adaptable for nut products to be eaten as such. It has been found that where the nuts are to be eaten as nuts or a confection, a solution between 20% and 22% is used. For use with other products, however, particularly where it is not known how the nut is to be ultimately used, or where the nut is to be used in bread making, or where a different nut flavor is to be imparted to the soy nut, such as pistachio, etc., to be used in ice cream, etc., it has been found that a 12% solution is satisfactory; and a nut made with a solution between 5% and 12% is known as an unsalted nut, as the salt flavor is imperceptible.

At the time that the brine is poured on the beans, substantially 1 lb. of sugar to every 100 lbs. dry beans is added. This sugar may contain flavoring such as a nut flavor, and by the use of this sugar a more crunchy, palatable product results. Where it has been decided that a nut flavor is to be used, said synthetic flavor, such as hickory, walnut, pistachio, etc., must be water soluble, and is added during the boiling step, being preferably introduced with the sugar. Where the nut flavor is introduced with the sugar, substantially 2 lbs. of sugar or molasses are added to every 100 lbs. dry soy beans, in addition to the 1 lb. of sugar normally added.

The beans are boiled in the brine from about 1½ hrs. to about 2 hrs., the length of boiling depending upon the variety of bean used. For example, in the case of Manchu and Dunfield beans, they must cook in the brine for about 1½ hrs. and 2 hrs. respectively, while in the case of Illini beans, it has been found that it is necessary to cook this type of bean 2½ hrs. or more. Thus this type of bean is less desirable than either of the other two. The beans are boiled slowly, and the temperature of the brine is raised slowly from 70° F. to boiling temperature, that is, 220° F., this temperature being that taken at the center of the brine.

While the beans are boiling the outer shell or skin of the bean comes off and floats to the top of the vessel, together with a frothy, white material, forming a rather thick layer on the surface. This thick layer of material is removed from time to time during the boiling operation. The beans are boiled until they become of a soft, mealy consistency, and after the boiling and skimming steps the beans are placed on racks and allowed to drain. If the bean is tested at this stage it is found that the bitter or unpleasant taste of the bean has entirely disappeared.

The boiled beans, after draining, are placed in a deep fat fryer containing cocoanut oil, or other suitable oils such as mineral or nut oils. The temperature of the cocoanut oil at the time that the beans are immersed is from 400° F. to 410° F. Where other oils are used, such as mineral or nut oils, or where oils of a lower flash point are used, the temperature must be reduced. This, however, is not desirable, as it is found that the quicker the moisture is driven out of the beans at this time, the better the ultimate product, so cocoanut oil, or an oil having a relatively high flash point such as around 400° F., is preferable. After the introduction of the beans, the temperature of the oil drops quickly to a rather low temperature, depending upon the amount of beans being processed. The temperature of the oil is then raised to such a point that the beans retain only between 2% and 3% moisture. If more than 3% moisture is present, the product is tough. If less than 2%, the product is burned. It has been found that the temperature to which the beans should be raised should be substantially 350° F. where a commercial quantity of beans such as 100 lbs. is handled. It is appreciated that if only a small quantity of beans is placed in the oil at 410° F. there would be substantially no decrease in the temperature. Therefore, in general, it may be said that the important consideration is that the amount of moisture in the beans be reduced from 120% to between 2% and 3%. Also, it has been found that the moisture should be removed from the beans as quickly as possible without burning them. The time required for the temperature to build up again to a point where the moisture is removed to decrease it to the required amount varies with the quantity of beans, and is substantially 8 min. and 18 min. where 50 and 100 lbs. are used. The beans are not removed until the moisture is reduced the required amount, that is, to between 2% and 3%.

It is preferable that a suitable flavoring material be added to the cocoanut oil in which the beans are frying so that the beans are cooked in the flavored cocoanut oil. A flavoring such as butter flavor is preferably used, and where butter flavor is used, it has been found that substantially 1 oz. of butter flavor is enough for 800 lbs. of oil. In adding other nut flavors such as hickory, walnut, pistachio and the like, such flavoring is added as above pointed out, that is, during the boiling step, so that the flavor must be a water soluble flavor, and is preferably introduced with the molasses or sugar.

When the product is removed it is of light brown color, and after the beans are removed from the cocoanut oil they are dried in a suitable manner, such as by being supported in racks; and the oil is allowed to drain back to the fryolator or frying vessel, or the beans may be placed in revolving bins or centrifuges for quickly drying them and, as before, the oil is permitted to drain back to the fryolator.

The beans are then removed from the racks and are placed in a rotating screen cylinder or other suitable device, and are tumbled or agitated therein to remove the remaining skins from the bean or nut. In the cylinder a large mesh screen is employed which permits the thin skins from the nuts to fall through the screen and into a receiving bin. The skin thus removed is finer than that removed in the boiling operation and is apparently an inner skin. After the skins have been removed in the rotating cylinder, the nuts may be removed from the cylinder and packaged.

In the event that it is desired to color a bean a particular shade as, for example, where a pistachio flavored nut is to be colored green, a green vegetable dye is placed in the water in which the beans are soaked, that is, in the initial step, and coloring is also added to the brine. The beans are then soaked a longer period than normally, substantially twice the soaking period being necessary as where no coloring is used.

It is to be understood that we do not wish to be limited by the process described, which is merely by way of illustration and not limitation, as variations of the process will of course be apparent to those skilled in the art without departing from the spirit of the invention or the scope of the claims.

We claim:

1. The method of processing soy beans which includes soaking the beans in water whereby the size of the bean is increased materially over that of the unsoaked bean in that the large diameter of the soaked bean is substantially twice that of the unsoaked bean and the length of the soaked bean is substantially twice that of the unsoaked bean, draining said beans, placing the beans in brine having a small amount of sugar therein, boiling said beans in said brine until they become soft and mealy, draining said beans, immersing said beans in hot oil, raising the temperature of said oil until but 2% or 3% of the moisture of the bean remains, drying said dehydrated beans and removing skins therefrom.

2. The method of processing soy beans which includes soaking the beans in water whereby the size of the bean is increased materially over that of the unsoaked bean in that the large diameter of the soaked bean is substantially twice that of the unsoaked bean and the length of the soaked bean is substantially twice that of the unsoaked bean, boiling the beans in brine, and frying the beans until but 2% or 3% of moisture remains in the beans.

3. The method of processing soy beans which includes soaking the beans in water at substantially 70° F. until said beans have absorbed water in an amount of substantially 120% by weight, placing the beans in brine having a small amount of sugar therein, boiling said beans in said brine until they become soft and mealy, skimming the boiling liquid from time to time to remove froth and skins, immersing said beans in cocoanut oil having a temperature before said immersion of substantially 410° F., raising the temperature of said cocoanut oil until but 2% or 3% of the moisture of the beans remains, drying said dehydrated beans and agitating the dried beans to remove the remaining skins.

4. The method of processing soy beans which includes soaking the beans in water until said beans have absorbed water in an amount of substantially 120% by weight, placing the beans in brine having a small amount of sugar therein, boiling said beans in said brine until they become soft and mealy, immersing said beans in cocoanut oil having a temperature before said immersion of substantially 410° F., raising the temperature of said cocoanut oil until but 2% or 3% of the moisture of the beans remains, drying said dehydrated beans and removing the remaining skins therefrom.

5. The method of processing soy beans which includes soaking the beans in water until said beans have absorbed water in an amount of substantially 120% by weight, placing the beans in brine having a small amount of sugar therein, boiling said beans in said brine until they become soft and mealy, immersing said beans in hot oil, raising the temperature of said oil until but 2% or 3% of the moisture of the bean remains, drying said dehydrated beans and removing the skins therefrom.

6. The method of processing soy beans which includes soaking the beans in water whereby the size of the bean is increased materially over that of the unsoaked bean in that the large diameter of the soaked bean is substantially twice that of the unsoaked bean and the length of the soaked bean is substantially twice that of the unsoaked bean, placing the beans in brine having a small amount of sugar therein, boiling said beans in said brine until they become soft and mealy, immersing said beans in cocoanut oil having a temperature before said immersion of substantially 410° F., raising the temperature of said cocoanut oil until but 2% or 3% of the moisture of the beans remains, drying said dehydrated beans and removing the remaining skins therefrom.

7. The method of processing soy beans which includes soaking the beans in water for a substantial period of time whereby the size of the bean is increased materially over that of the unsoaked bean in that the large diameter of the soaked bean is substantially twice that of the unsoaked bean and the length of the soaked bean is substantially twice that of the unsoaked bean, boiling said beans in a solution of brine of substantially 12%, removing the loosened skins, and frying said beans in an oil until but 2% or 3% of the moisture remains.

8. The method of processing soy beans which includes soaking the beans in water for a substantial period of time whereby the size of the bean is increased materially over that of the unsoaked bean in that the large diameter of the soaked bean is substantially twice that of the unsoaked bean and the length of the soaked bean is substantially twice that of the unsoaked bean, boiling said beans in a solution of brine, said brine having sugar therein in a ratio substantially of one pound of sugar to every one hundred pounds of dry beans, removing the loosened skins and frying said beans in an oil.

9. The method of processing soy beans which includes soaking the beans in water containing a vegetable dye for a substantial period of time whereby the size of the bean is increased materially over that of the unsoaked bean in that the large diameter of the soaked bean is substantially twice that of the unsoaked bean and the length of the soaked bean is substantially twice that of the unsoaked bean, boiling said beans in brine having a small amount of sugar, molasses, nut flavoring and said vegetable dye therein, and immersing said beans in cocoanut oil having a temperature before said immersion of substantially 410° F., raising the temperature of said cocoanut oil until but 2% or 3% of the moisture of the beans remains and drying said dehydrated beans.

10. The method of processing soy beans which includes soaking the beans in water for a substantial period of time whereby the size of the bean is increased materially over that of the unsoaked bean in that the large diameter of the soaked bean is substantially twice that of the unsoaked bean and the length of the soaked bean is substantially twice that of the unsoaked bean, boiling said beans in brine having nut flavoring therein, and immersing said beans in cocoanut oil having a temperature before said immersion of substantially 410° F., raising the temperature of said cocoanut oil until but 2% or 3% of the moisture of the beans remains, and drying said dehydrated beans.

IRVING A. NOHE.
ROLLIN H. MOULTON.